US008413277B2

(12) United States Patent
Davis et al.

(10) Patent No.: US 8,413,277 B2
(45) Date of Patent: Apr. 9, 2013

(54) PNEUMATIC LIFT WITH UNIDIRECTIONAL VALVE

(75) Inventors: David T. Davis, Bethlehem, PA (US);
Edward A. Gilchrest, Jr., Oxford, CT (US); Matthew L. Prancuk, Brookfield, CT (US)

(73) Assignee: Woodlark Circle, Inc., Bethlehem, PA (US)

( * ) Notice: Subject to any disclaimer, the term of this patent is extended or adjusted under 35 U.S.C. 154(b) by 740 days.

(21) Appl. No.: 12/577,802

(22) Filed: Oct. 13, 2009

(65) Prior Publication Data

US 2011/0083280 A1    Apr. 14, 2011

(51) Int. Cl.
*A47C 27/10* (2006.01)
*A47C 16/00* (2006.01)
*A47B 7/00* (2006.01)
*F16K 15/00* (2006.01)
*F16K 17/00* (2006.01)
*F16K 21/04* (2006.01)

(52) U.S. Cl. .............. 5/710; 5/611; 5/655.3; 137/512.1; 137/516.11; 137/536

(58) Field of Classification Search .............. 5/710, 711, 5/712, 706, 655.3; 137/536, 516.11
See application file for complete search history.

(56) References Cited

U.S. PATENT DOCUMENTS

| | | | |
|---|---|---|---|
| 198,687 A | 9/1916 | Williams et al. | |
| 1,282,980 A | 10/1918 | Takach | |
| 3,137,011 A | 6/1964 | Fischer | |
| 3,695,582 A | 10/1972 | Clay | |
| 3,864,766 A * | 2/1975 | Prete, Jr. | 5/644 |
| 3,914,808 A | 10/1975 | Woods | |
| 4,417,639 A | 11/1983 | Wegener | |
| 4,517,690 A | 5/1985 | Wegener | |
| 4,688,760 A | 8/1987 | Garman et al. | |
| 4,766,628 A * | 8/1988 | Walker | 5/706 |
| 4,786,032 A | 11/1988 | Garman et al. | |
| 4,805,248 A | 2/1989 | Lunau | |
| 4,993,736 A | 2/1991 | Garman et al. | |
| 5,423,094 A | 6/1995 | Arsenault et al. | |
| 5,606,785 A | 3/1997 | Shelberg et al. | |
| 5,651,149 A | 7/1997 | Garman | |
| 5,669,086 A | 9/1997 | Garman | |
| 5,727,270 A | 3/1998 | Cope et al. | |
| 6,199,827 B1 | 3/2001 | Rimington et al. | |
| 6,457,197 B1 | 10/2002 | Wu | |
| 6,551,450 B1 * | 4/2003 | Thomas et al. | 156/580.1 |
| 6,848,467 B1 * | 2/2005 | Kubik et al. | 137/315.33 |
| 7,107,641 B2 | 9/2006 | Davis | |
| 7,376,995 B2 | 5/2008 | Davis | |
| 2003/0159218 A1 | 8/2003 | Lin et al. | |
| 2004/0226101 A1 * | 11/2004 | Lin et al. | 5/710 |
| 2005/0132490 A1 * | 6/2005 | Davis | 5/81.1 R |

(Continued)

FOREIGN PATENT DOCUMENTS

DE    1897870    4/1964

OTHER PUBLICATIONS

International Search Report—PCT/US2010/051277.

*Primary Examiner* — Michael Trettel
*Assistant Examiner* — Duoni Pan
(74) *Attorney, Agent, or Firm* — Duane Morris LLP

(57) ABSTRACT

A pneumatic lift including inflatable mattresses stacked one atop another and arranged in air flow communication with one another, but with each being independently deflatable.

6 Claims, 18 Drawing Sheets

U.S. PATENT DOCUMENTS

2006/0021133 A1 2/2006 Davis
2006/0037145 A1* 2/2006 Wang .................................. 5/709
2006/0054855 A1* 3/2006 Chaffee ........................ 251/336
2007/0095403 A1* 5/2007 Su ............................ 137/512.15

* cited by examiner

PNEUMATIC LIFT WITH UNIDIRECTIONAL VALVE

FIELD OF THE INVENTION

The present invention generally relates to devices suitable for lifting living creatures and, more particularly, to a pneumatic lift suitable for use in vertically moving living creatures.

BACKGROUND OF THE INVENTION

There is a need for a compact, lightweight and easily portable patient lifting device to assist caregivers in lifting prone patients from a lower position, e.g., the floor, to a relatively higher position, e.g., a bed, table, gurney, or vehicle, etc.; for use in the home, in institutional settings, and in the outside world. Transferring of disabled patients is a leading cause of injury in the health-care industry, with the nursing occupation having among the highest incidence of back injury, despite the prior art and the availability of commercial patient lifts. These lifts are under-utilized for a number of reasons, such as restricted space in many hospital wards and bathrooms, cumbersome operating requirements, the indignity involved in the mode of transport, the additional time required for performing the transfer, and the unavailability of the lift at both the patient's starting and destination locations. In addition, many patients are essentially home-bound due to the unavailability of a conveniently portable lift, reducing their quality of life unnecessarily. A device is required that is simple to set up and use, feels safe, secure and is not intimidating for the patient, and can be transported with the patient.

This problem is pervasive in the home health care industry as well, where spaces are not designed for safe patient transfers, and the caregiver is often alone and has no help during lifts. Since conventional lifts are available in less than ten percent of the homes visited by home health care professionals, a device that can be easily brought from home to home is also required. In addition, most prior art lifting devices do not provide for the reduction of hip and back deflection during lifting. This is a significant problem, since if a person's hip or back is already injured, such uncontrolled deflections could exacerbate the existing condition, or possibly cause additional injury.

While this field contains considerable prior art, these devices have proven inadequate. For example, U.S. Pat. No. 4,805,248, issued to Lunau is typical of ceiling-mounted patient lifts. While effective, these are limited to use in very well defined areas. U.S. Pat. No. 3,137,011, issued to Fischer is representative of a common type of mobile patient lift. A major disadvantage of this design is that the patients are essentially suspended from a hook. The resultant swaying motion during transfer is disconcerting to most patients. In addition, the patient is transported in a partially reclined position, increasing their sense of helplessness and indignity, particularly if used outside in public.

U.S. Pat. No. 3,914,808, issued to Woods teaches the use of a short flexible sling in a front-loading orientation, with a pivoting column. The base must be relatively wide in order to avoid tipping as the column is rotated, and there is no means for compactly transporting or storing the lift. Additionally, the use of a fixed length sling requires that the patient be sitting precisely on the center of the sling, to avoid tipping the patient as the column is raised. This increases the time and training required to use the lift.

Pneumatically inflatable, and hydraulically expandable lifting bags are also known. For example, DE-U-1,897,870 discloses an extendable or inflatable lifting device having a pressure release valve assembly. U.S. Pat. No. 3,695,582, issued to Clay discloses a lifting jack for motor vehicles which uses fluid pressure for operating power to raise the wheel of a vehicle. The jack relies upon a pair of stacked hollow flexible plastic bags that may be filled with a suitable fluid.

In U.S. Pat. No. 5,606,785, issued to Shelberg et al., an inflatable air mattress positioner is provided for use with a casket, coffin or alternative container. The assembly includes a partially pneumatic pillow with a chamber in which is disposed a plurality of air chambers, each one of which has a corresponding air tube and valve assembly. A cushion coacts with the air bladders to position the head, upper arm, chest and shoulder region of a cadaver so that the cadaver chin is disposed in an acceptable proper height in relation with the chest. The assembly includes an inflatable air mattress having a plurality of air chambers which are independently inflatable to position a cadaver at an appropriate height and angle in the casket. Additional separate independent air bladders are also provided to be disposed under the cadaver to aid in positioning the cadaver and tilt the cadaver along its longitudinal axis for mourner viewing as well as positioning the back, arms, head, neck or any other part of the cadaver that requires adjustment.

In the U.S. Pat. Nos. 4,688,760, 4,786,032, 4,993,736, 5,651,149, and 5,669,086, all issued to Garmen et al., a variety of lifting apparatus are provided that include a base, a platform disposed above the base, a thrust mechanism positioned between the platform and the base to lift the platform with respect to the base. Garmen et al. often choose a pneumatic thrust mechanism in the form of stacked bellows including a flexible wall composed of substantially inelastic material and having a vertically spaced horizontal stiffener. The bellows include an inlet to allow a gaseous material to inflate each bag for applying lifting forces to the platform. U.S. Pat. No. 6,199,827, issued to Rimington, et al., also discloses an extendable or inflatable lifting device None of the foregoing patents adequately address the problem of insuring that a lift is available at both a patient's starting and final locations. Patient transfer mattresses are also well known in the art which include at least two flexible material sheets, that together define a plenum chamber, with at least one sheet being completely perforated with small pinholes over its surface area, and which open up directly to the interior of the plenum chamber. Such prior art mattresses are used by arranging the perforated sheet so that it faces an underlying fixed, generally planar support surface, such as a floor or table. When the mattress is charged with pressurized air, the escape of air under pressure through the pinholes acts initially to jack a load placed upon the mattress (i.e., to lift the load in increments) and thereby creates an air bearing of relatively small height between the underlying fixed, generally planar support surface and the perforated flexible sheet.

For example, in U.S. Pat. No. 4,517,690, issued to Wegener, an air pallet is disclosed that is formed from upper and lower thin flexible film sheets sealed at their edges to form a plenum chamber. Wegener's air pallet functions to move a load with minimal friction over an underlying generally planar fixed support surface. The bottom thin flexible material sheet is perforated by small diameter perforations such as pin holes.

In U.S. Pat. No. 4,417,639, issued to Wegener, a pair of relatively rigid planar members are arranged overlying each other, and are coupled about their edges by a flexible film band to form a jacking plenum chamber. The upper planar member functions as the load support, having a gas inlet hole adjacent one edge. Gas under pressure enters an end of the jacking plenum chamber and escapes through the outer end which allows for jacking of the load. Wegener's design is only capable of jacking the load, e.g., a patient lying on the mattress, several inches above the underlying support surface.

In U.S. Pat. Nos. 7,107,641 and 7,376,995, a double chambered transfer mattress is provided that is capable of partial deflation that includes a top inflatable mattress and a bottom inflatable mattress that are separated by a common wall from one another. A selectable inlet/outlet valve is arranged for airflow communication between an interior chamber of the bottom inflatable mattress and a source of pressurized air. A one-way valve is positioned through the common wall so as to provide selective air flow communication between the top inflatable mattress and the bottom inflatable mattress so that when the inlet/outlet valve is closed, and air continues to escape from perforations in the bottom inflatable mattress, the one-way valve is actuated so as to prevent deflation of the top inflatable mattress.

In U.S. Application Publication No. 2005/0132490, a pneumatic lift is provided that includes inflatable mattresses that are stacked one atop another, with select ones of the inflatable mattresses being arranged in internal air flow communication. Each of the inflatable mattresses includes a top panel having a width, a length, a peripheral edge, a bottom panel having the same width, length, and a peripheral edge, and a perimeter band extending between the top panel and the bottom panel. The peripheral edges of the top and bottom panels are sealingly fastened to one another to form the inflatable mattress. The peripheral band defines at least one through-hole for air flow communication with the interior of at least one other inflatable mattress. A plurality of baffle-panels are also provided each having a width and a length and being attached to an inner surface of the top panel and an inner surface of the bottom panel so as to be transversely oriented between the top panel and the bottom panel. In this way, the baffle-panels define a pair of longitudinally extending air flow passageways disposed between an edge of the baffle-panels and an interior surface of the perimeter band. At least one conduit is arranged in air flow communication between the at least one through-hole in adjacent inflatable mattresses. A source of pressurized air is arranged in airflow communication with one of the at least one through-holes so as to be in airflow communication with the interior of one of the inflatable mattresses.

SUMMARY OF THE INVENTION

The present invention provides, in its broadest aspects, a unidirectional valve arranged in air flow communication between each of a first inflatable mattress and a second inflatable so as to allow for the selective inflation/deflation of one mattress with respect to the other mattress. The unidirectional valve includes a first housing configured to be sealingly located in a panel of a first inflatable mattress. The first housing has at least one opening arranged in airflow communication with an interior of the first mattress and a passageway or conduit communicating between an interior portion of the first housing and an ambient environment. Advantageously, the conduit provides for pressure-equalization between the interior portion of the first housing and the ambient environment. A second housing of the unidirectional valve is configured to be sealingly located in a panel of a second inflatable mattress so as to be in mating relationship with the first housing. The second housing has at least one opening arranged in air flow communication with the interior of the second mattress. A resilient diaphragm is captured by a complementary portion of the first housing so as to isolate the conduit from the interiors of the inflatable mattresses.

In another embodiment of the invention, a system of inflating or deflating stacked mattresses is provided that includes a unidirectional valve arranged in air flow communication between each of a first inflatable mattress and a second inflatable. The unidirectional valve includes a first housing configured to sealingly penetrate a portion of the first inflatable mattress with at least one opening in the first housing communicating with an interior of the first mattress. A conduit defined in the first housing is arranged in air flow communication between an interior portion of the first housing and the ambient environment. A second housing is configured to sealingly penetrate a portion of the second inflatable mattress so as to be in mating relationship with the first housing. The second housing has at least one opening communicating with an interior of the second mattress. A resilient diaphragm is captured by the first housing so as to isolate the conduit from the interiors of the inflatable mattresses.

In a further embodiment of the invention, a pneumatic lift is provided that provides a first inflatable mattress that defines a first internal chamber and a second inflatable mattress that defines a second internal chamber. The first inflatable mattress is positioned in overlying relation to the second inflatable mattress so as to define a common region between them. A unidirectional valve is arranged in air flow communication with each of the first internal chamber and the second internal chamber. A first housing of the unidirectional valve sealingly penetrates a portion of the first inflatable mattress with at least one opening in the first housing communicating with the first internal chamber. A pressure-equalization conduit is defined in the first housing and arranged so as to communicate between an interior portion of the first housing and the common region. A second housing sealingly penetrates a portion of the second inflatable mattress in aligned, mating relationship with the first housing. The second housing includes at least one opening arranged in air flow communication with the second internal chamber. A diaphragm is captured by the first housing so as to isolate the pressure-equalization conduit from the at least one openings in the first and the second housings.

In yet a further embodiment of the invention, a pneumatic lift is provided that includes a first inflatable mattress having a top panel, a bottom panel, and a perimeter band that joins the top panel to the bottom panel so as to define a first chamber. A second inflatable mattress is also provided having a top panel, a bottom panel, and a perimeter band that joins the top panel to the bottom panel so as to define a second chamber. The first inflatable mattress is positioned in overlying relation to the second inflatable mattress such that the bottom panel of the first inflatable mattress confronts the top panel of the second inflatable mattress thereby defining a region between the confronting top panel and bottom panels. The inflatable mattresses are arranged in internal air flow communication with one another through a unidirectional valve comprising a first housing that sealingly penetrates the bottom panel of the first inflatable mattress with at least one opening communicating with the first chamber and a pressure-equalization conduit communicating between an interior portion of the first housing and the region between the confronting top panel and bottom panels. A second housing sealingly penetrates the top panel of the second inflatable mattress in aligned, mating relationship with the first housing. The second housing has at least one opening communicating with the second chamber. A biased diaphragm is captured by a portion of the first housing so as to isolate the pressure-equalization conduit and the interior portion of the first housing from the openings in the first and the second housings, thereby maintaining the interior portion of the first housing at ambient atmospheric pressure during inflation and deflation of the first and second mattresses.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figures 1, 1A:
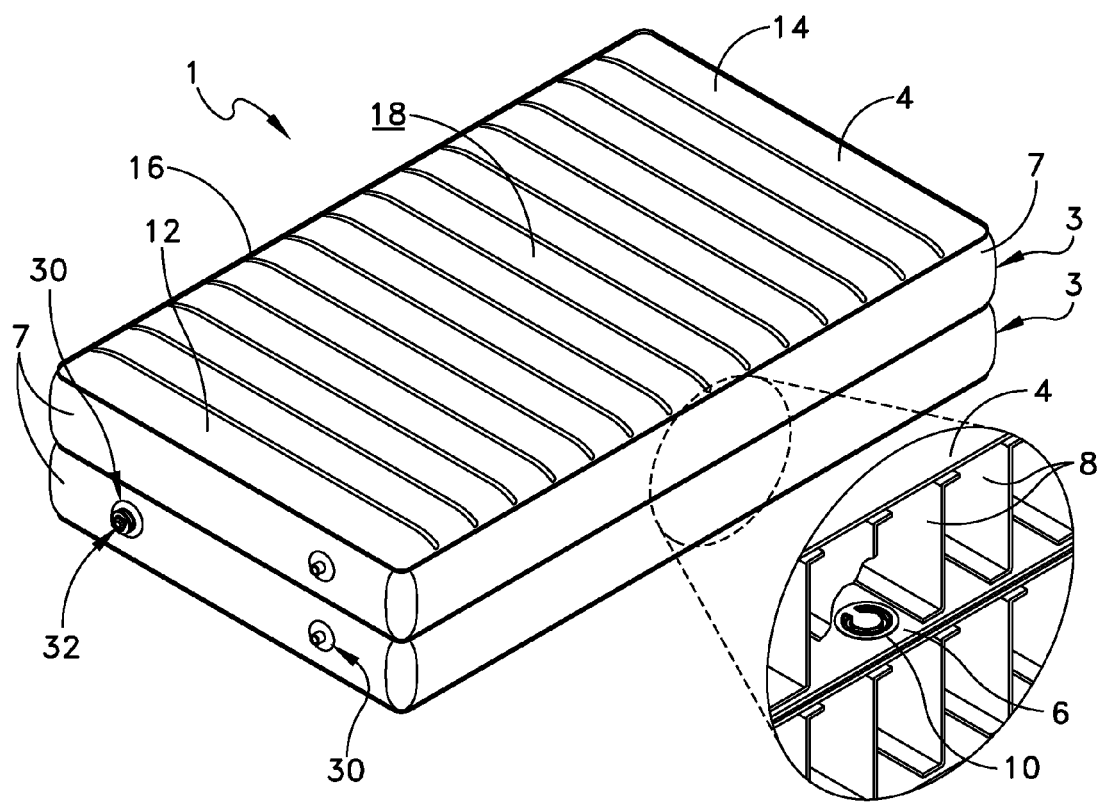
FIG. 1 is an end on perspective view of a pneumatic lift formed in accordance with the present invention.
FIG. 1A is an inset representing the interior portion of the pneumatic lift with the perimeter bands removed for clarity of illustration.
Figure 2:
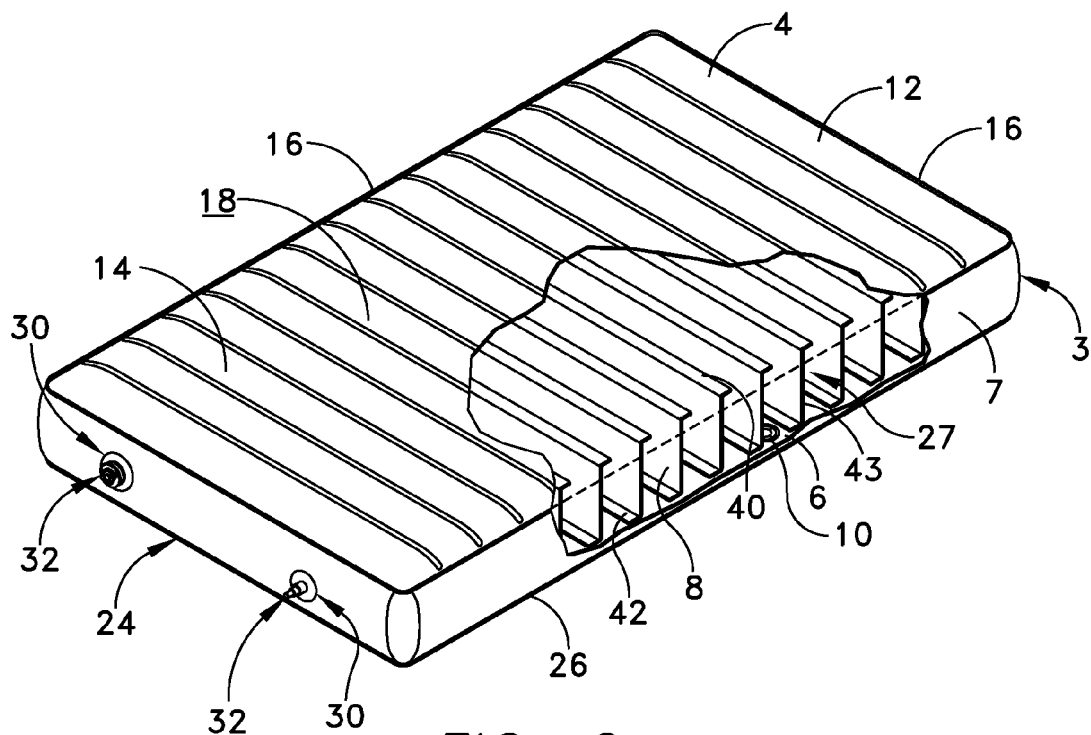
FIG. 2 is a partially broken-away, perspective view of a inflatable mattress formed in accordance with the present invention.
Figure 3:
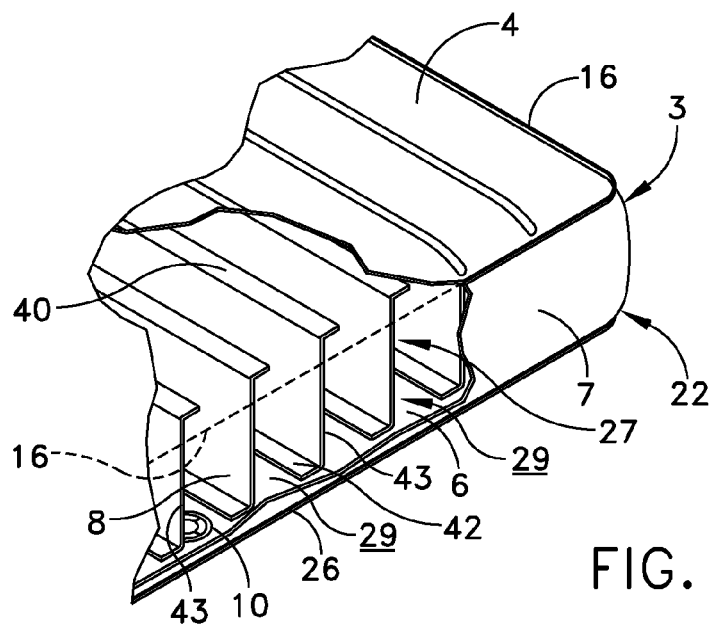
FIG. 3 is a broken-away perspective view of a corner portion of the inflatable mattress shown in FIG. 2.
Figure 4:
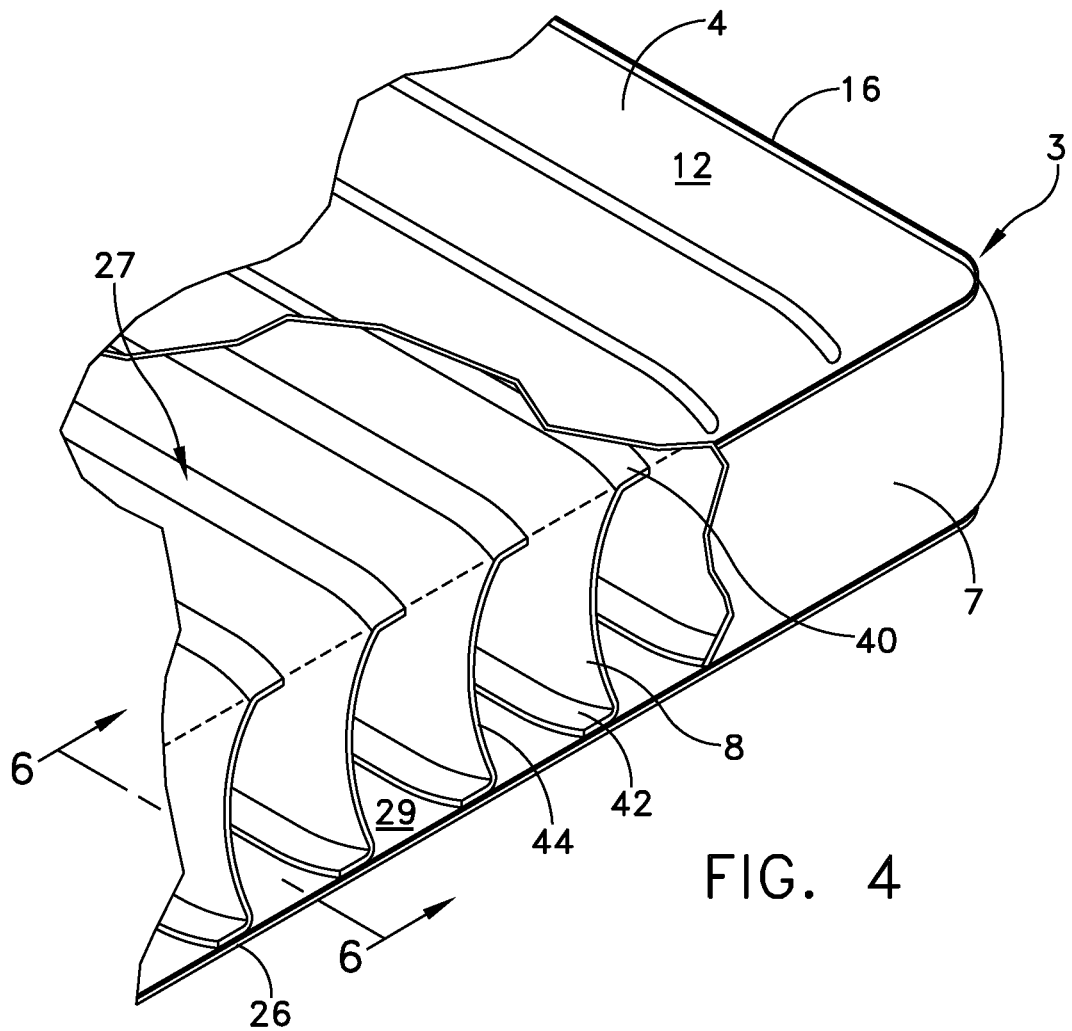
FIG. 4 is a broken-away perspective view of a corner portion of an alternative inflatable mattress having scalloped edged baffle-panels.
Figure 5:
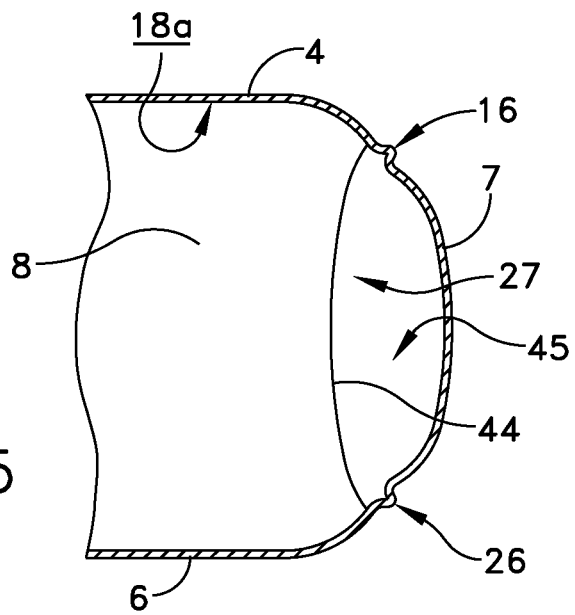
FIG. 5 is a broken-away, cross-sectional view of the inflatable mattress having scalloped edged baffle-panels shown in FIG. 4.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Referring to FIGS. 1-5, a pneumatic lift 1 formed in accordance with one embodiment of the present invention comprises two or more inflatable mattresses 3 that are stacked and secured together, one atop another. Each inflatable mattress 3 includes a top panel 4, a bottom panel 6 (FIGS. 1A, 2 and 3) a perimeter band 7, and a plurality of internally disposed, transverse baffle-panels 8, and at least one unidirectional valve 10. More particularly, top panel 4 comprises a head portion 12, a foot portion 14, and a peripheral edge 16, and is formed from a sheet of nylon scrim or the like, that is often coated on at least its outer surface 18 with a water proof coating. The inner surface of top panel 4 may also be coated with a water proof coating as well. Water proof coatings that may be used in connection with the invention include any of the well known polymeric or elastomeric compounds that are known to be impervious to semi-solids and liquids, such as, blood, urine, feces, hospital strength disinfecting compounds, alcohol, or the like.

Bottom panel 6 comprises a head portion 22, a foot portion 24, and a peripheral edge 26, (FIGS. 2 and 3) and is also formed from a sheet of nylon scrim or the like, that may also be coated on at least its outer surface with a water proof coating. Inner surface 29 of bottom panel 6 may also be coated with a water proof coating as well. Perimeter band 7 extends between peripheral edges 16 and 26, and circumferentially around top panel 4 and bottom panel 6, so as to enclose a central chamber 27 and thereby form each inflatable mattress 3. At least one through-bore 30 is defined in the portions of perimeter band 7 that lie between head portions 12,22 and foot portions 14,24. An air inlet valve 32 is positioned within through-bore 30, and sized and shaped to accept a source of flowing air (not shown). Peripheral edges 16 and 26 may be fastened by any conventional means, e.g., ultrasonic welding, adhesives, of mechanical fasteners.

Referring to FIGS. 2-5, plurality of baffle-panels 8 each comprise substantially rectangular sheets of nylon scrim or the like, and include a top edge 40, a bottom edge 42, and end edges 44; Baffle-panels 8 may have differing widths depending upon their position within inflatable mattress 3. Each top edge 40 is fastened transversely to a portion of the inner surface of top panel 4, and each bottom edge 42 is fastened transversely to a portion of inner surface 29 of bottom panel 6. End edges 44 are arranged in spaced relation to the inner facing surface of longitudinally extending portions of perimeter band 7 (FIGS. 4 and 5), so as to define a pair of longitudinally oriented air flow channels 45 (FIG. 5) within each inflatable mattress 3. In one embodiment, a curved or scalloped end edge 44 may be employed to increase the size of air flow channels 45.

Figure 8:
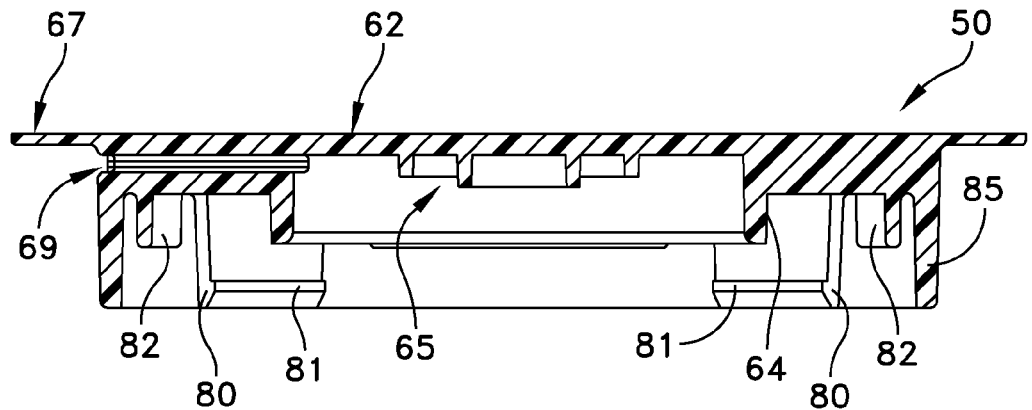
FIG. 8 is a cross-sectional view of the top housing as taken along lines 8-8 in FIG. 7.
Figure 9:
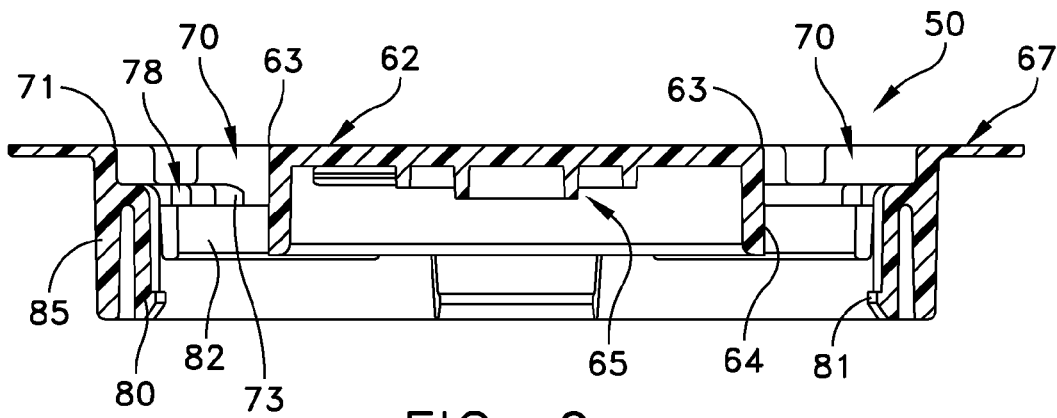
FIG. 9 is a cross-sectional view of the top housing as taken along lines 9-9 in FIG. 7.
Figure 10:
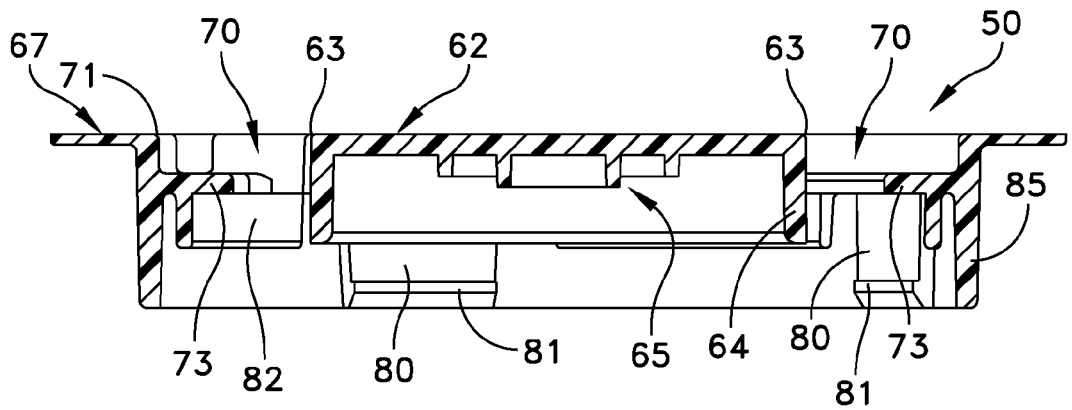
FIG. 10 is a cross-sectional view of the top housing shown in FIG. 7, as taken along lines 10-10.
Figure 11:
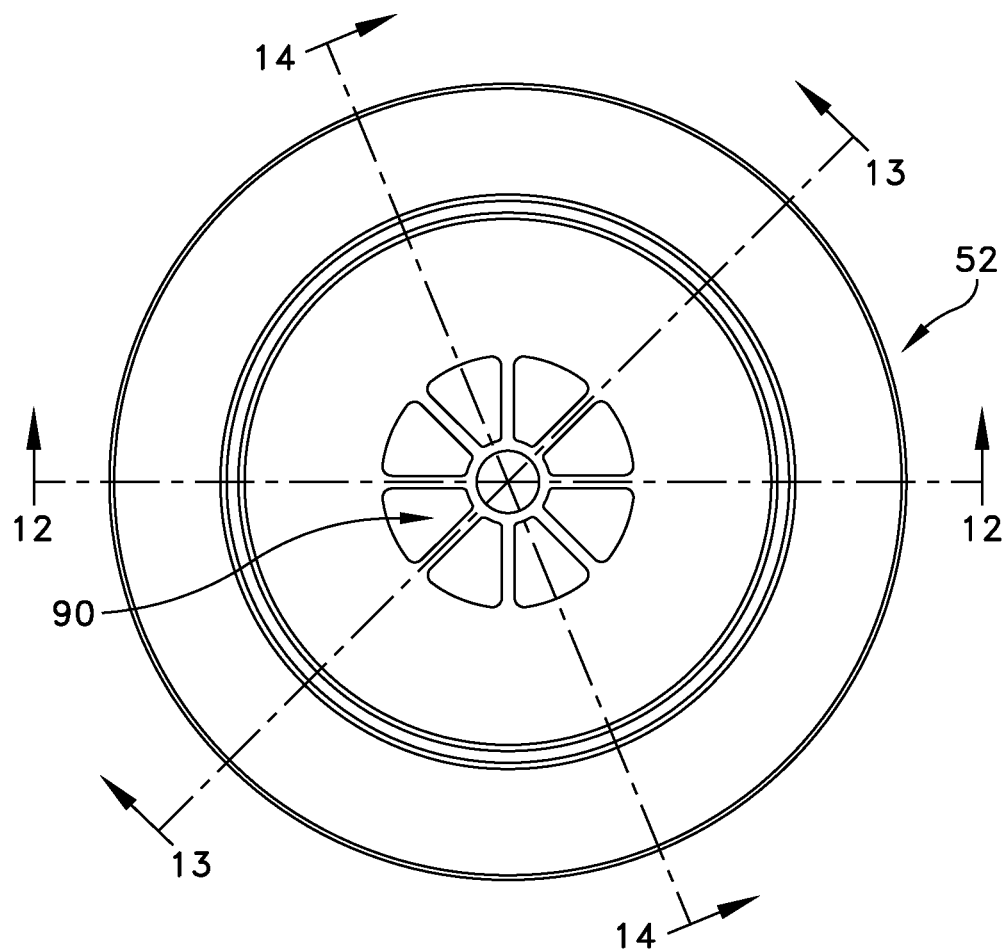
FIG. 11 is a plan view of a bottom housing formed in accordance with the present invention.
Figure 12:
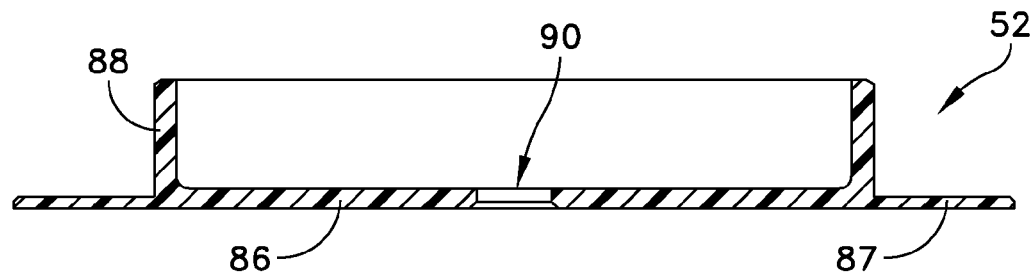
FIG. 12 is a cross-sectional view of the bottom housing shown in FIG. 11, as taken along lines 12-12.
Figure 13:
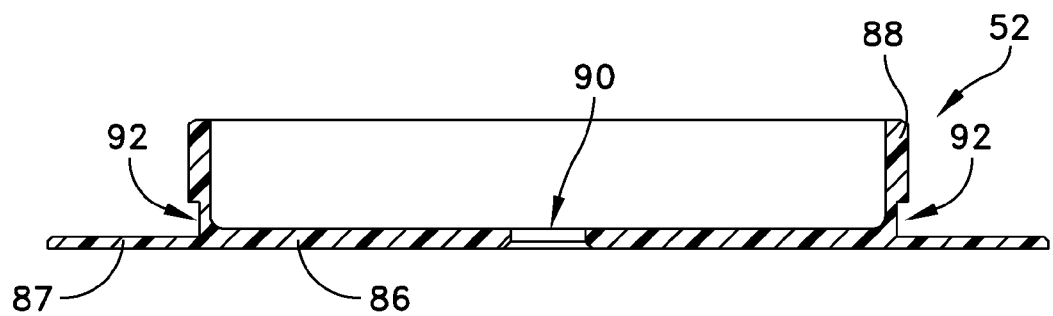
FIG. 13 is a cross-sectional view of the bottom housing as taken along lines 13-13 in FIG. 11.
Figure 14:
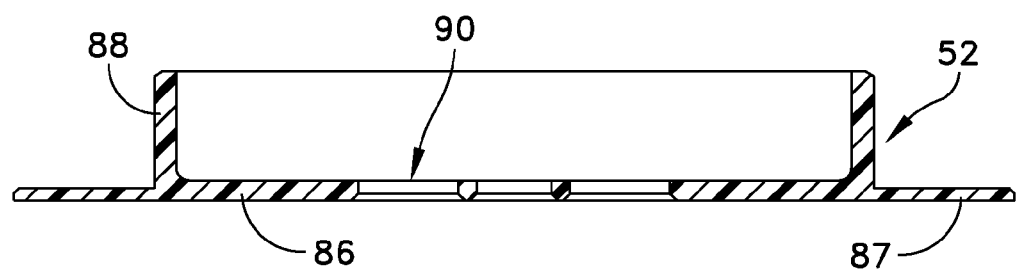
FIG. 14 is a cross-sectional view of the bottom housing as taken along lines 14-14 in FIG. 11.

Referring to FIGS. 6-10, unidirectional valve 10 comprises a top housing 50, a bottom housing 52, a baffle 54, a spring-plate 56, and a spring 58. More particularly, top housing 50 includes a central pier 62 that is often circular in shape with an intermittent free edge 63, a downwardly projecting annular wall 64, and two spaced apart, coaxially arranged annular rings 65 that project downwardly from the under surface of central pier 62. Annular rings 65 are arranged in coaxial relation to downwardly projecting annular wall 64. Central pier 62 structurally supports an annular flange 67 via a plurality of struts 68 that extend radially outwardly in circumferentially spaced relation to one another from free edges 63. One strut 68a is wider and thicker than the other struts 68 so as to provide sufficient structural support and definition for a pressure-equalization conduit 69 (FIG. 8). Conduit 69 extends below the outer surface of strut 68a and communicates between the region surrounding coaxially arranged annular rings 65 and the region adjacent to an outer surface of a downwardly projecting annular wall 85. Outer annular wall 85 projects downwardly from the underside of annular flange 67 so as to surround the entirety of structures located below central pier 62. As a result of this construction, open air flow communication is provided between both regions via conduit 69 so as to maintain a common pressure between them.

A plurality of recesses 70 are defined between edges 63, struts 68, and an inner edge 71 of annular flange 67. A shelf 73 partially blocks each recess 70, with a through-opening 75 being defined between a free edge of shelf 73 and an outer surface of downwardly projecting annular wall 64. A through-hole 78 is defined in a central portion of each shelf 73, with a cantilevered latch 80 projecting downwardly from the outer edge of each shelf 73 that defines each through-hole 78. Each cantilevered latch 80 is arranged in spaced coaxial relation to the outer surface of downwardly projecting annular wall 64, and includes an inwardly projecting shoulder 81 formed on its free end. A plurality of downwardly projecting annular wall segments 82 are arranged circumferentially between cantilevered latches 80 so as to provide for structural rigidity when top housing 50 is assembled to bottom housing 52, as will hereinafter be disclosed in further detail.

Referring to FIGS. 6 and 11-14, bottom housing 52 includes a plate 86 that is often circular in shape, and an upwardly projecting annular wall 88. Annular wall 88 is arranged on plate 86 so as to be complementarily positioned with respect to downwardly projecting annular wall 64, cantilevered latches 80, and downwardly projecting annular wall segments 82 of top housing 50. As a result of the location of annular wall 88 on plate 86, an outer portion of plate 86 defines an annular flange 87 that projects radially outwardly from the base of annular wall 88. A plurality of openings 90 are defined through the central portion of plate 86, and are encircled by upwardly projecting annular wall 88. A plurality of recesses 92 are arranged in spaced circumferential relation about the outer portion of the base of upwardly projecting annular wall 88, so as to be complementarily positioned with respect to cantilevered latches 80 of top housing 50.

Figure 6:
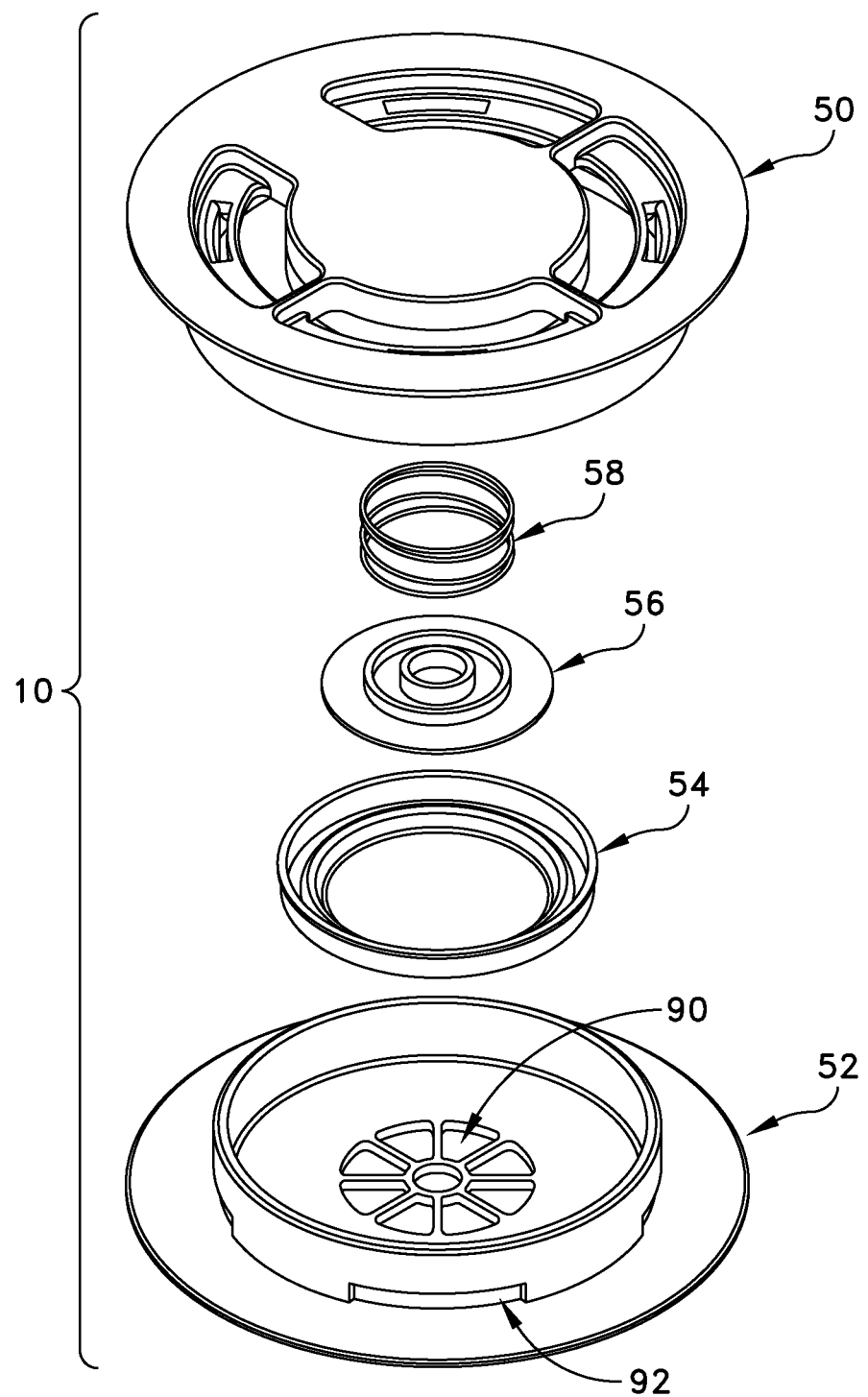
FIG. 6 is an exploded view of a unidirectional valve formed in accordance with one embodiment of the present invention.
Figure 7:
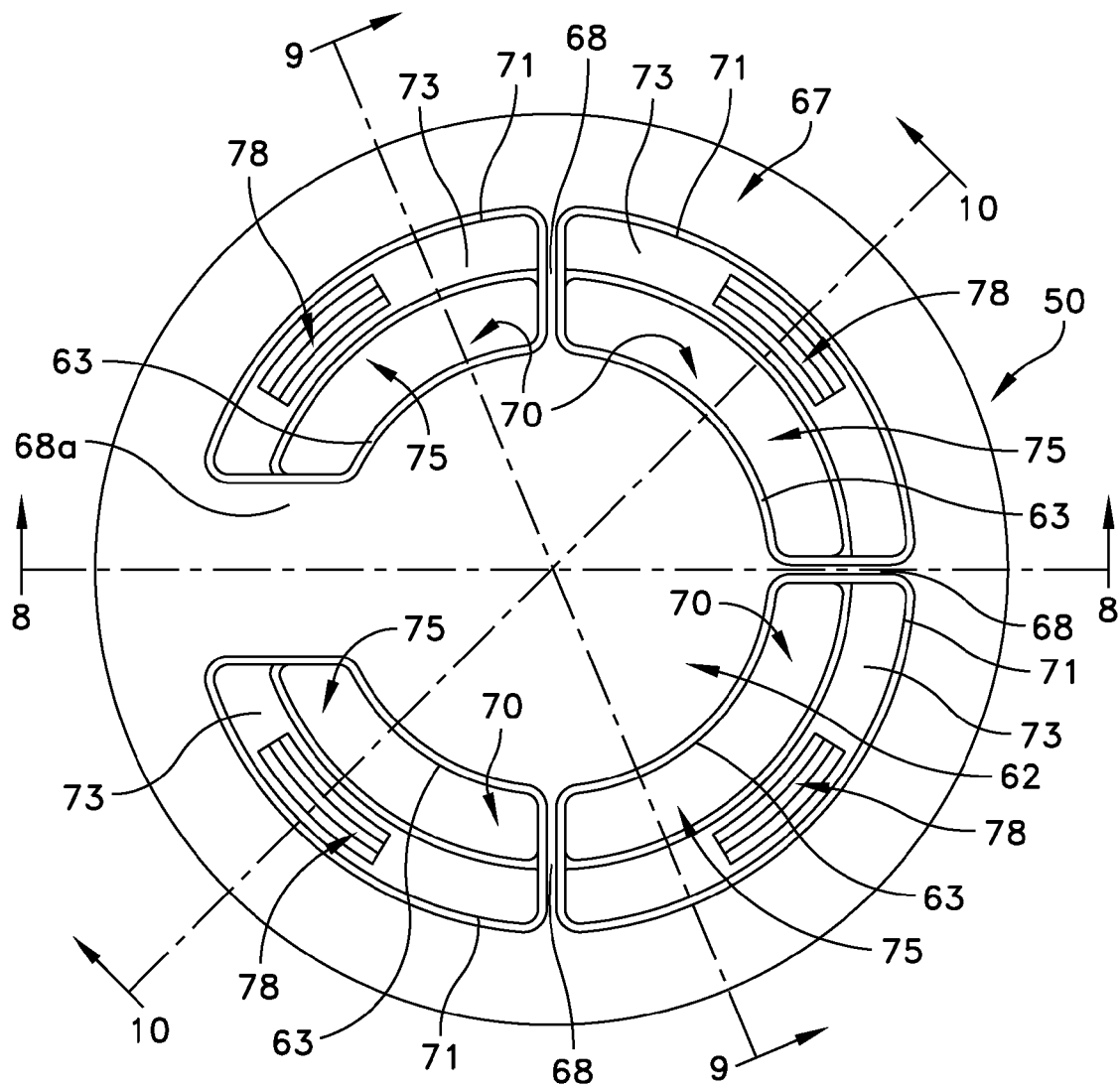
FIG. 7 is a top plan view of the assembled unidirectional valve shown in FIG. 6.
Figure 15:
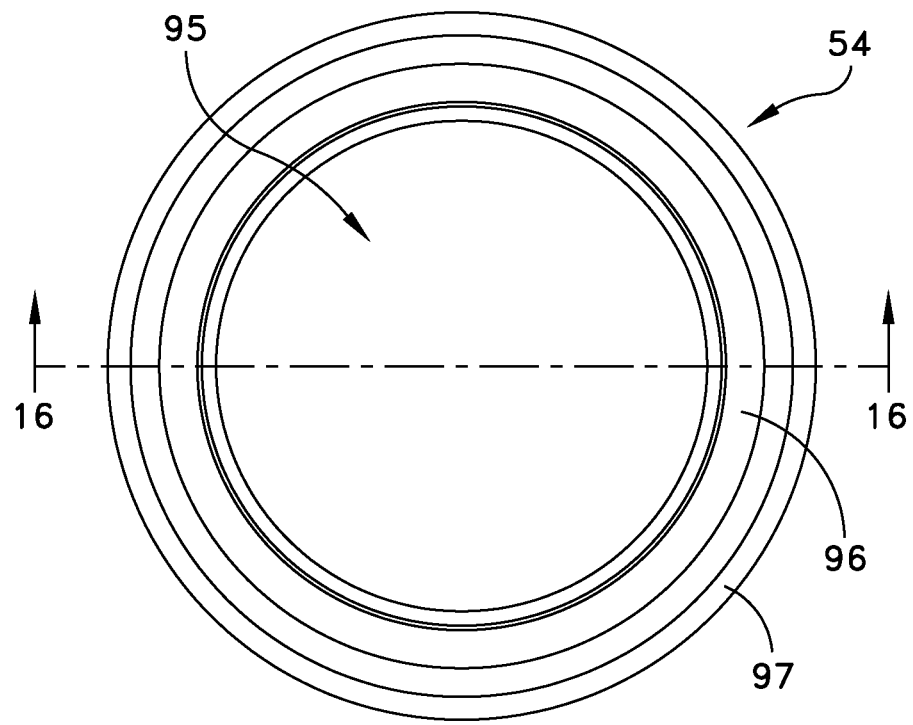
FIG. 15 is a plan view of an elastomeric baffle formed in accordance with the present invention.
Figure 16:
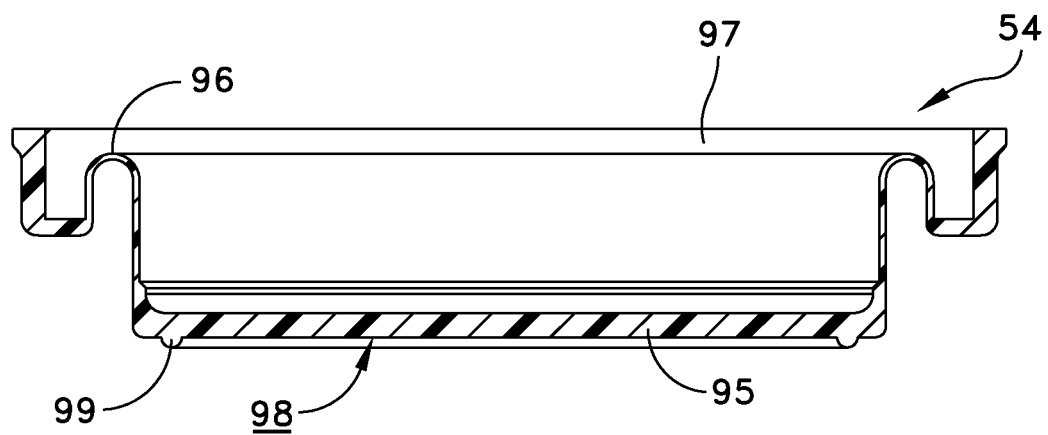
FIG. 16 is a cross-sectional view of the baffle shown in FIG. 15, as taken along lines 16-16.

Referring to FIGS. 6, and 15-16, baffle 54 is formed as a compliant membrane and includes central planer portion 95, a flexible annular protrusion 96 and an annular wall 97 that encircles first annular protrusion 96. Flexible annular protrusion 96 is formed so as to provide a resilient spring membrane that allows for biased movement of central planar portion 95 relative to annular wall 97. Central planer portion 95 also defines an outer surface 98 that is surrounded by a lip 99. Annular wall 97 is sized and shaped so as to be slipped over and thereby sealingly captured upon downwardly projecting annular wall 64 of central pier 62 of top housing 50. In this arrangement, central planer portion 95 of baffle 54 defines a taut membrane stretched across and supported upon the free edge of annular wall 64 such that outer surface 98 may resiliently flex inwardly and outwardly, while being biased outwardly by spring 58 through spring plate 56. Advantageously, the capture of baffle 54 upon annular wall 64 defines an internal chamber 110 that houses spring 58 and spring plate 56. Internal chamber 110 is isolated from through-holes 78 and through-openings 75 defined in top housing 50 as well as being isolated from openings 90 in bottom housing 52, i.e., there is little or no airflow communication between internal chamber 110 and these through-holes and openings. Internal chamber 110, once formed between baffle 54 and central pier 62, is normally only in air flow communication with conduit 69.

Baffle 54 is often formed from an elastomeric material. Examples of some useful elastomeric materials that may be used to form baffle 54 include, without limitation, rubbers, elastomeric gums and thermoplastic elastomers. The term "elastomeric gum", refers to polymers which are noncrystalline and which exhibit after cross-linking rubbery or elastomeric characteristics. The term "thermoplastic elastomer" refers to materials which exhibit, in various temperature ranges, at least some elastomer properties. Such materials generally contain thermoplastic and elastomeric moieties. For purposes of this invention, the elastomer material can be cross-linked or non cross-linked when used in the inventive compositions. Illustrative examples of some suitable elastomeric gums for use in this invention include, without limitation, polyisoprene (both natural and synthetic), ethylene-propylene random copolymers, poly(isobutylene), styrene-butadiene random copolymer rubbers, styrene-acrylonitrilebutadiene terpolymer rubbers with and without added copolymerized amounts of *, *-unsaturated carboxylic acids, polyacrylate rubbers, polyurethane gums, random copolymers of vinylidene fluoride and, for example, hexafluoropropylene, polychloroprene, chlorinated polyethylene, chlorosulphonated polyethylene, polyethers, plasticized poly(vinyl chloride), substantially non-crystalline random co- or terpolymers of ethylene with vinyl esters or acids and esters of *, *-unsaturated acids, silicone gums and base polymers, for example, poly(dimethyl siloxane), poly(methylphenyl siloxane) and poly(dimethyl vinyl siloxanes). Some illustrative examples of thermoplastic elastomers suitable for use in the invention include, without limitation, graft and block copolymers, such as random copolymers of ethylene and propylene grafted with polyethylene or polypropylene side chains, and block copolymers of *-olefins such as polyethylene or polypropylene with ethylene/propylene or ethylene/propylene/diene rubbers, polystyrene with polybutadiene, polystyrene with polyisoprene, polystyrene with ethylene-propylene rubber, poly(vinylcyclohexane) with ethylene-propylene rubber, poly(*-methylstyrene) with polysiloxanes, polycarbonates with polysiloxanes, poly(tetramethylene terephthalate) with poly(tetramethylene oxide) and thermoplastic polyurethane rubbers.

Figure 17:
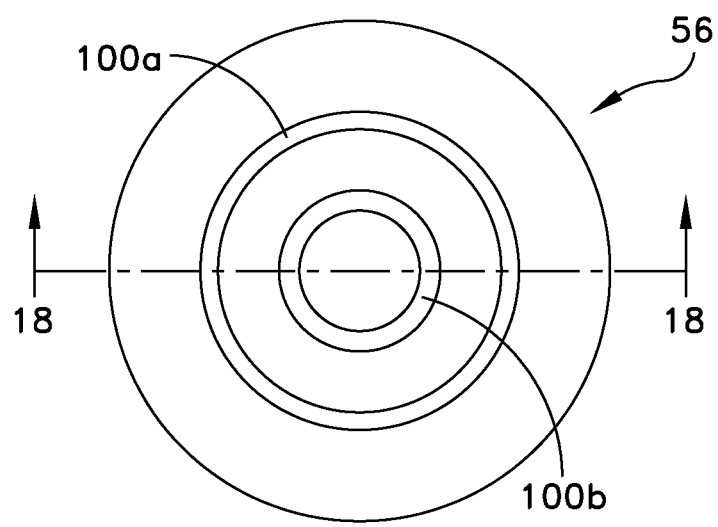
FIG. 17 is a plan view of a spring-plate formed in accordance with the present invention.
Figure 18:
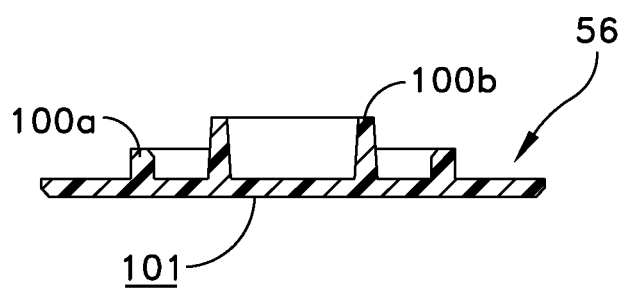
FIG. 18 is a cross-sectional view of the spring-plate shown in FIG. 17, as taken along lines 18-18.
Figure 19:
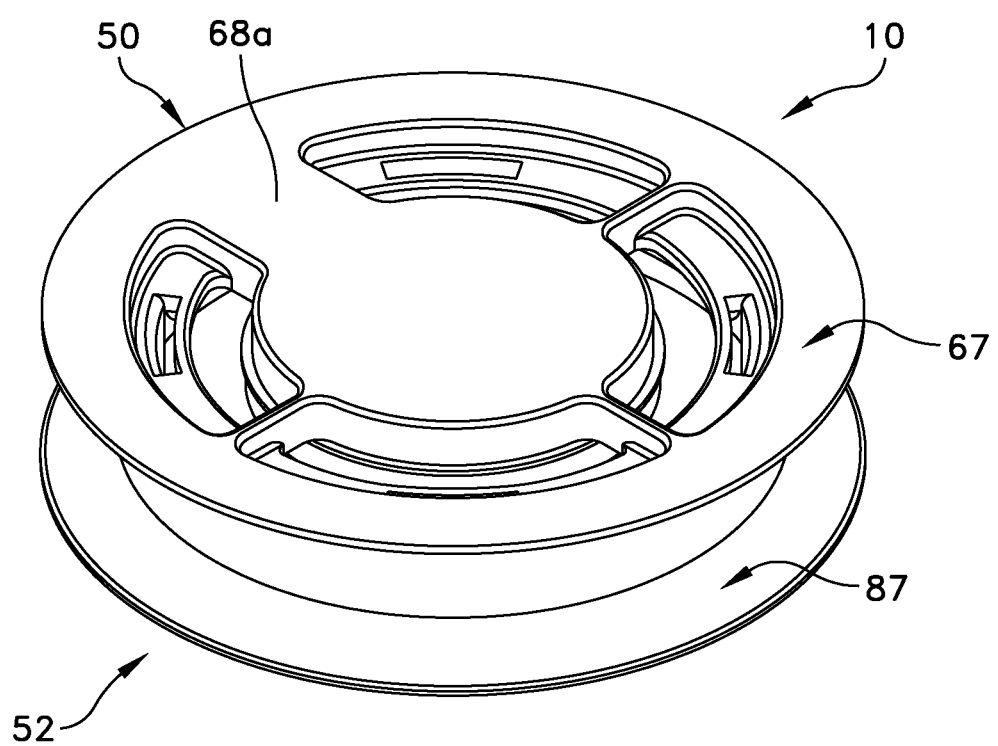
FIG. 19 is a perspective view of a fully assembled unidirectional valve formed in accordance with the present invention.

Referring to FIGS. 6, and 17-18, spring-plate 56 is formed from a flat disc that is circular in shape having two spaced apart, coaxially arranged annular rings 100a and 100b projecting upwardly from one surface of spring-plate 56. Annular ring 100b often stands proud of annular ring 100a so as to provide a stop during operation of unidirectional valve 10. Spring-plate 56 also defines a second, outer surface 101 that is substantially flat. Spring 58 (FIG. 6) is often a coiled compression spring of known spring constant, and having an inner diameter that is slightly larger than the outer diameter of annular ring 100a of spring-plate 56. A typical unbiased height for spring 58 is about one to one and a quarter inches, with an installed and preloaded height of about five and a half to six tenths of an inch or so. In one embodiment of the invention, spring 58 has a spring constant in the range from about three pounds per inch to about four and a half pounds per inch. Spring 58 is very often preloaded to about two to three pounds per inch when assembled in unidirectional valve 10, resulting in an advantageous cracking pressure of about one to one and a half pound per square inch during operation of unidirectional valve 10.

A pneumatic lift 1 is assembled according to the present invention in the following manner. To begin, two, three, four, or more inflatable mattresses 3 are each individually assembled by laying out a bottom panel 6 on a suitable support surface so that baffle-panels 8 may be transversely arranged along the length of inner surface 29. Once in this position, bottom edge 42 of each baffle-panel 8 is fixedly fastened to inner surface 29 of bottom panel 6. Each baffle-panel 8 is often heat sealed along the interface between bottom edge 42 and inner surface 29 of bottom panel 6. This heat sealing may be done with the application of heat or ultrasonic energy at the interface between bottom edge 42 and inner surface 29. If the pneumatic lift being formed is to comprise a top mattress in the resulting structure, a hole is formed in bottom panel 6 that is sized to accept penetration of outer annular wall 85 of top housing 52. Annular flange 67 will be positioned on top of inner surface 29, to which it is sealingly bonded, mechanically fastened, or ultrasonically or RF welded.

Once a plurality of baffle-panels 8 are fastened to inner surface 29 of bottom panel 6, top panel 4 is arranged in overlying confronting relation to bottom panel 6 so that head portion 12 of top panel 4 is confronting head portion 22 of bottom panel 6 and foot portion 14 of top panel 4 is confronting foot portion 24 of bottom panel 6. From this arrangement, each top edge 40 of each baffle-panel 8 is fixedly fastened to the inner surface of top panel 4. If the inflatable mattress 3 being formed is to be a bottom mattress in the resulting pneumatic lift, a hole is formed in top panel 4 that is sized to accept penetration of annular wall 88 of bottom housing 52. Annular flange 87 will be positioned on top of inner surface 18a, to which it is sealingly bonded, mechanically fastened, or ultrasonically or RF welded. In order to complete construction of each inflatable mattress 3, it is necessary to sealingly fasten peripheral edge 16 of top panel 4 and peripheral edge 26 of bottom panel 6 to corresponding edges of perimeter band 7. Inflatable mattresses 3 may be held in a stack by fastening their respective peripheral edges 16,26 or by heat sealing, bonding, snaps, or other fastening means known in the art.

To complete a pneumatic lift 1 in accordance with one embodiment of the present invention, a first mattress 3 is positioned in overlying relation to a second mattress 3, such that bottom panel 6 of the top mattress is arranged in confronting relation to top panel 4 of the bottom mattress. In this position, annular wall 85 of top housing 50 is projecting downwardly from bottom panel 6 of the top mattress while annular wall 88 is projecting upwardly from top panel 4 of the bottom mattress. At the same time, spring 58 is positioned in coaxial surrounding relation to annular rings 65 projecting downwardly from the inner surface of central pier 62 of top housing 50. Once in this position, spring plate 56 is positioned in confronting spaced relation to annular rings 65 such that spring 58 is slipped over ring 100a on the surface of spring disk 56. Baffle 54 is then arranged in surrounding relation to spring disk 56 so as to position flat surface 101 directly on top of central planar portion 95 of baffle 54. Once in this position, baffle 54 and spring disk 56 are moved toward top housing 50 so that annular wall 97 of baffle 54 engages and slips over annular wall 64 of top housing 50 so as to sealingly capture annular wall 64 thus forming internal chamber 110 (FIGS. 20-25). As this occurs, spring 58 is biased between spring plate 56 and central pier 62 within internal chamber 110 such that spring 58 is compressed from its typical unbiased height of about one to one and a quarter inches to its preloaded height of about five and a half to six tenths of an inch or so. In this way, spring 58 is preloaded to about two to three pounds per inch, resulting in an advantageous cracking pressure of about one to one and a half pound per square inch.

With baffle 54 in place on annular wall 64, top housing 50 is then moved toward bottom housing 52 such that inwardly projecting shoulder 81 of cantilever latch 80 engages the outer surface of annular wall 88 of bottom housing 52 thereby biasing cantilever latch 80 toward annular wall 85 of top housing 50. Top housing 50 is moved toward bottom housing 52 until shoulder 81 engages the portion of the outer base of wall 88 that defines recess 92. Shoulder 81 then slips into recess 92 thereby securely fastening top housing 50 to bottom housing 52. Once top housing 50 and bottom housing 52 are assembled to one another, shoulder 81 is latched into recess 92, and lip 99 of baffle 54 is substantially sealingly engaged with the inner surface of plate 86 and in surrounding relation to openings 90.

As a result of this construction, internal chamber 110 is isolated from through-holes 78 and through-openings 75 defined in top housing 50 from openings 90 in bottom housing 52. Through-holes 78 and through-openings 75 defined in top housing 50 are temporarily disposed in air flow isolation from openings 90 in bottom housing 52 as a result of lip 99 of baffle 54 being biased against the inner surface of plate 86 by spring 58 so as to be in surrounding relation to openings 90. Internal chamber 110 is in airflow communication with a region 115 that is defined between bottom panel 6 of the top mattress and top panel 4 of the bottom mattress, as a consequence of conduit 69. Advantageously, throughout inflation or deflation of the mattresses that have been joined in this way by unidirectional valve 10, internal chamber 110 and region 115 are in constant airflow communication through conduit 69.

Figure 20:
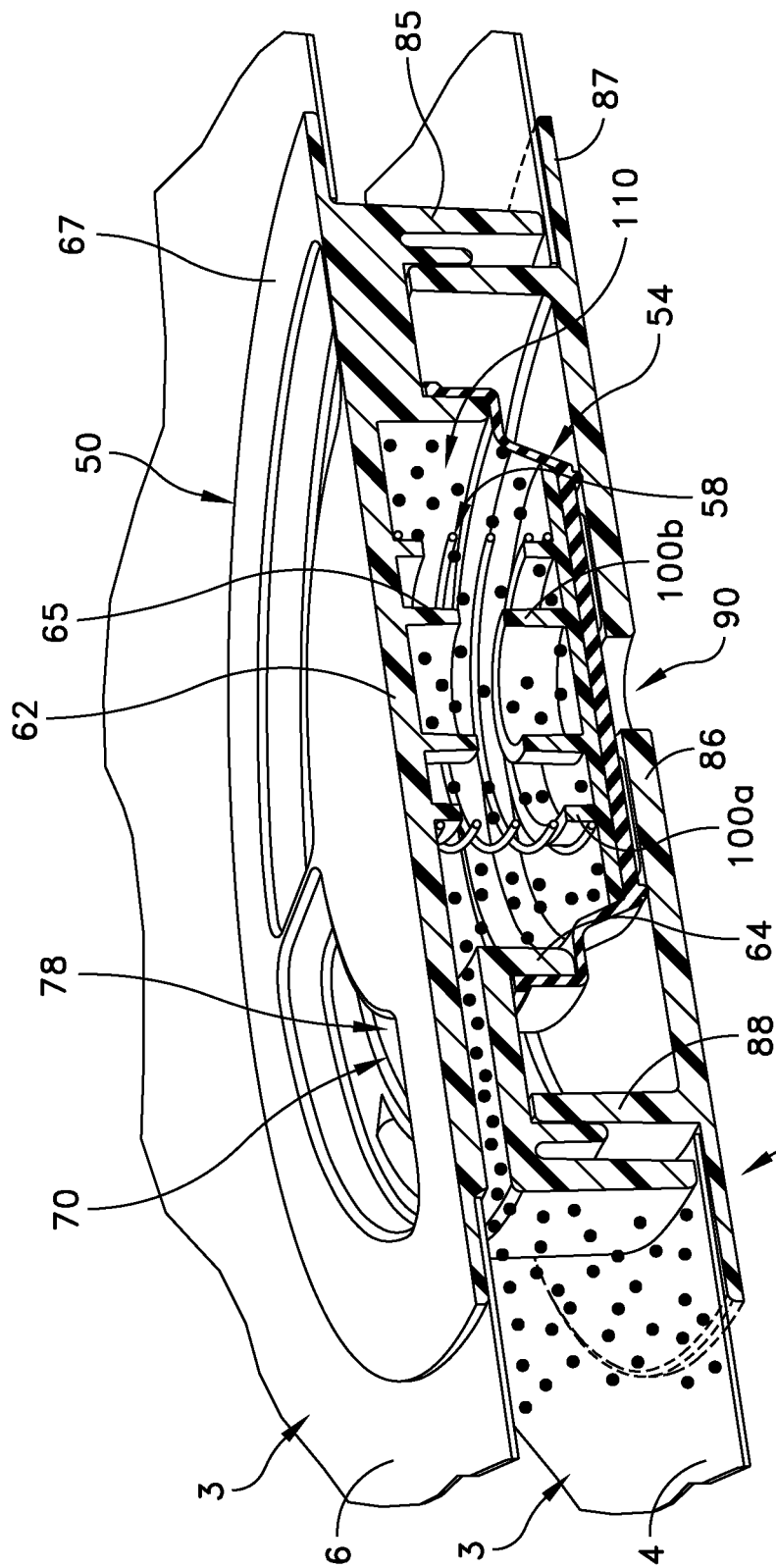
FIG. 20 is a cross-sectional view of a unidirectional valve positioned between the bottom panel of a top mattress and a top panel of a bottom mattress.
Figure 21:
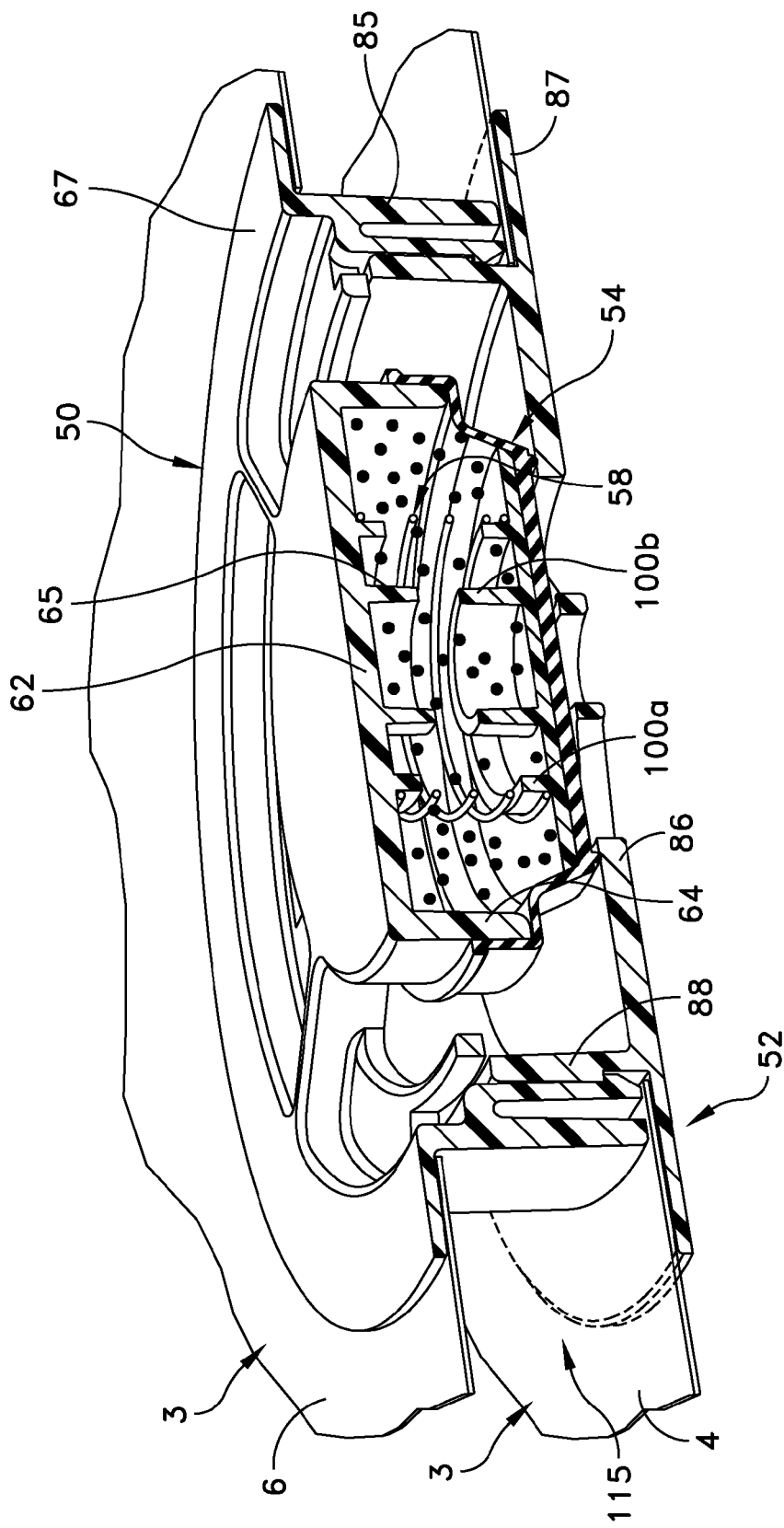
FIG. 21 is a cross-sectional perspective view similar to that shown in FIG. 20 illustrating a sealed configuration of the baffle.
Figures 26, 26A:
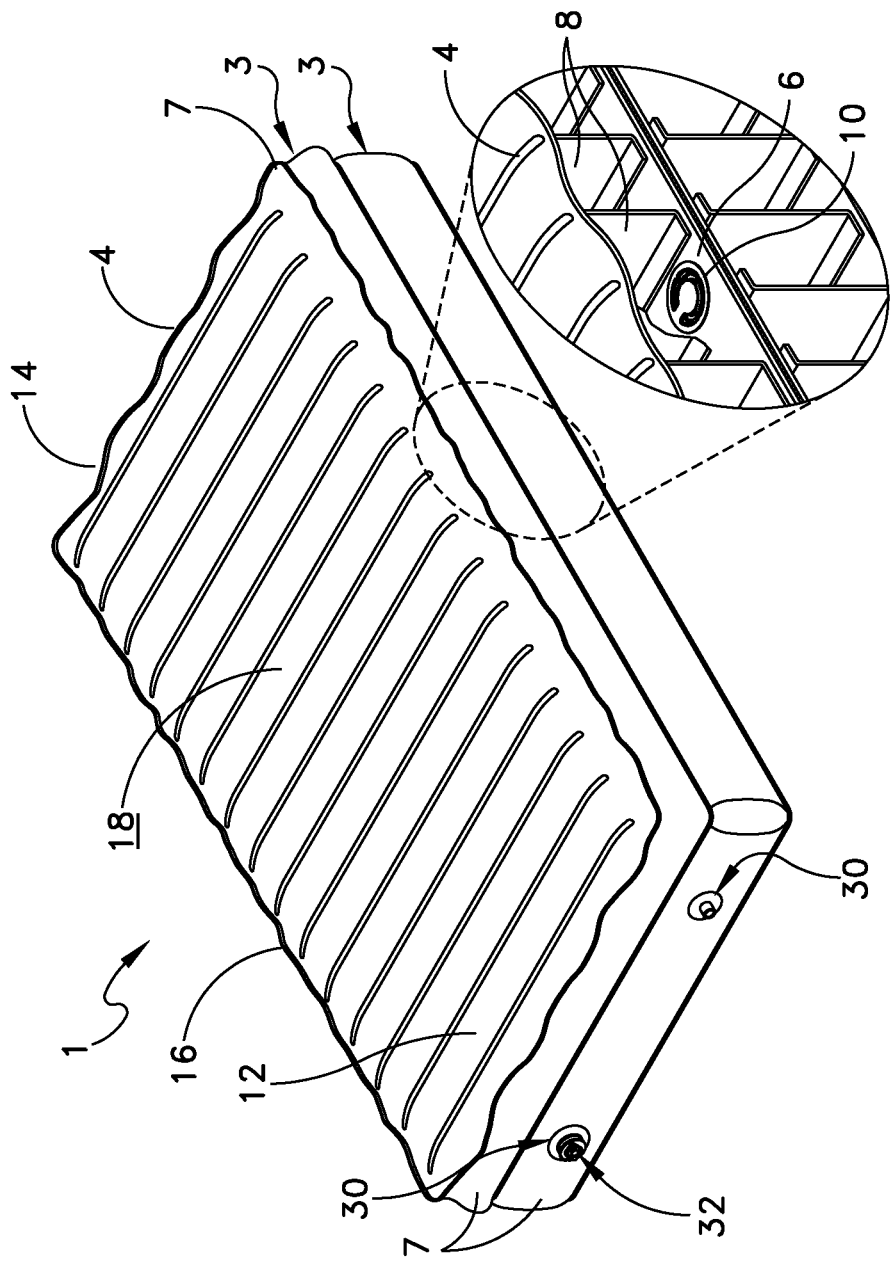
FIG. 26 is a perspective view of a pneumatic lift formed in accordance with the present invention illustrating a partially deflated upper mattress and an inflated lower mattress.
FIG. 26A is an inset showing the unidirectional valve positioned within the fully inflated top mattress with the perimeter band removed for clarity of illustration.

Pneumatic lift 1 is operated in the following manner. An object to be lifted, e.g., a human being, is placed atop outer surface 18 of top most inflatable mattress 3, while pneumatic lift 1 is in a fully or partially deflated state (FIGS. 26 and 26A). It will be understood by fully deflated that little or no air will be present in at least one of central chambers 27 of one or both of the stacked inflatable mattresses 3 making up the pneumatic lift. Once the object is in position, pressurized air (e.g., at or around 2.8 psi or between 75 and 100 cubic feet per minute of air flow) is introduced through an air supply hose (not shown) which is interconnected in air flow communication with valve 34 in the bottom inflatable mattress 3. As air enters central chamber 27, it flows through air flow channels 45, and thereby between each of baffle-panels 8 so as to inflate the inflatable mattress, very often via the bottom mattress. As this occurs, lip 99 of baffle 54 remains in substantially sealed engagement with the inner surface of plate 86 and in surrounding and sealing relation to openings 90 in bottom housing 52 (FIGS. 20-21).

Figure 22:
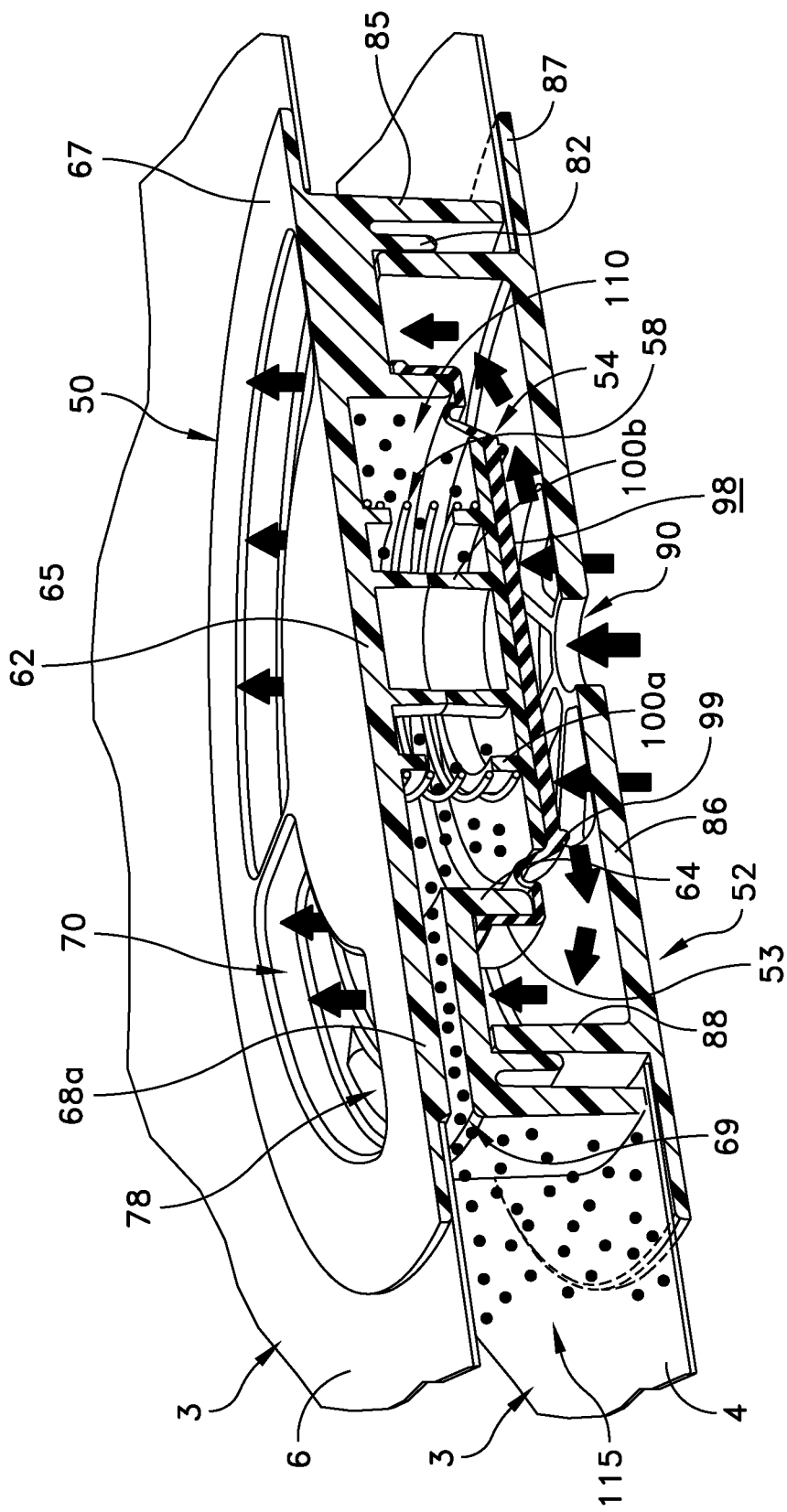
FIG. 22 is a cross-sectional perspective view similar to FIGS. 20-21 representing an unsealed configuration of the baffle and illustrating the common pressurization between the interior of the valve and the space located between the bottom panel of the top mattress and top panel 4 of the bottom mattress.
Figure 23:
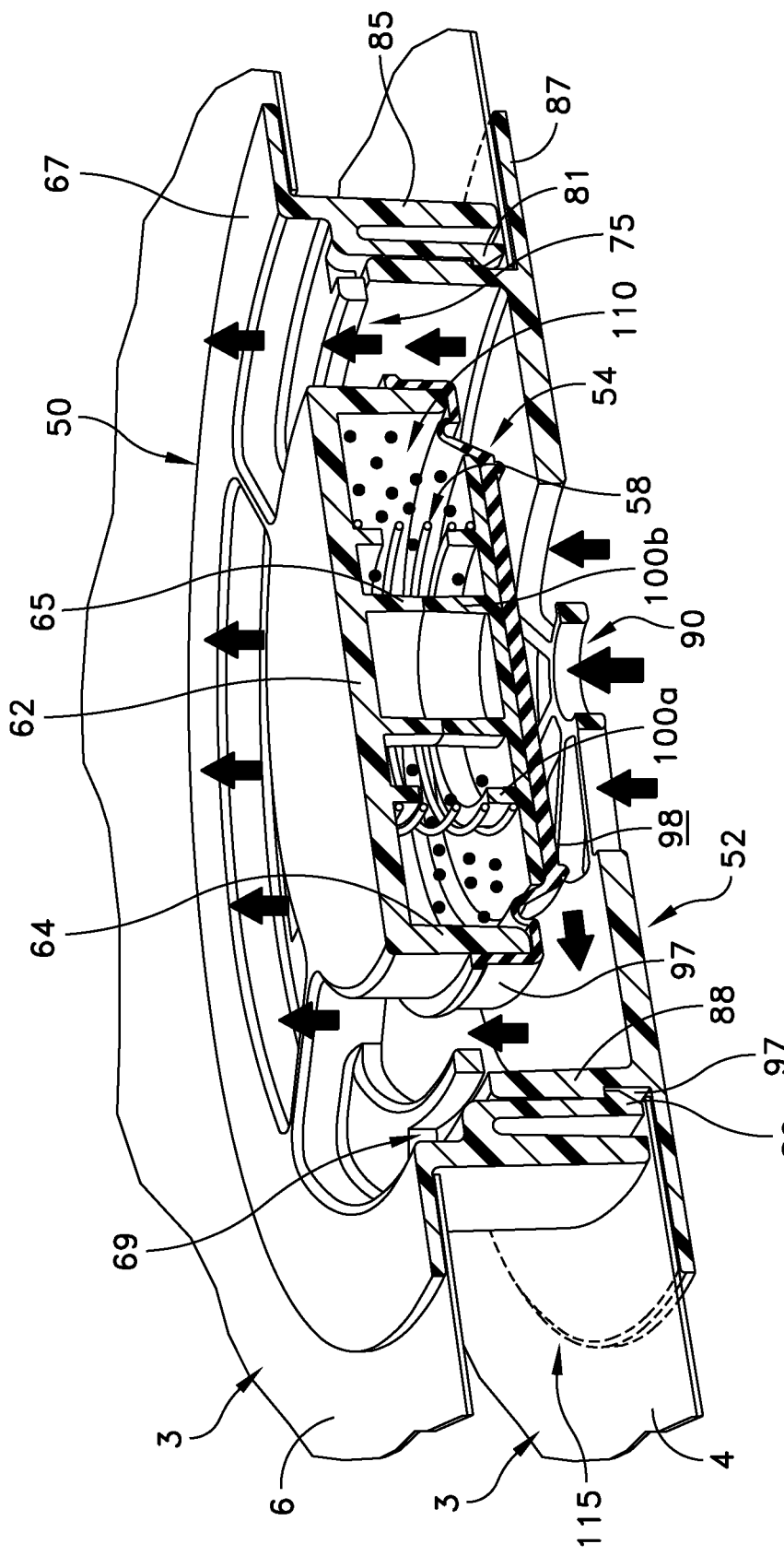
FIG. 23 is a cross-sectional perspective view similar to FIGS. 20-22 showing air flow between a first and second mattresses.
Figure 24:
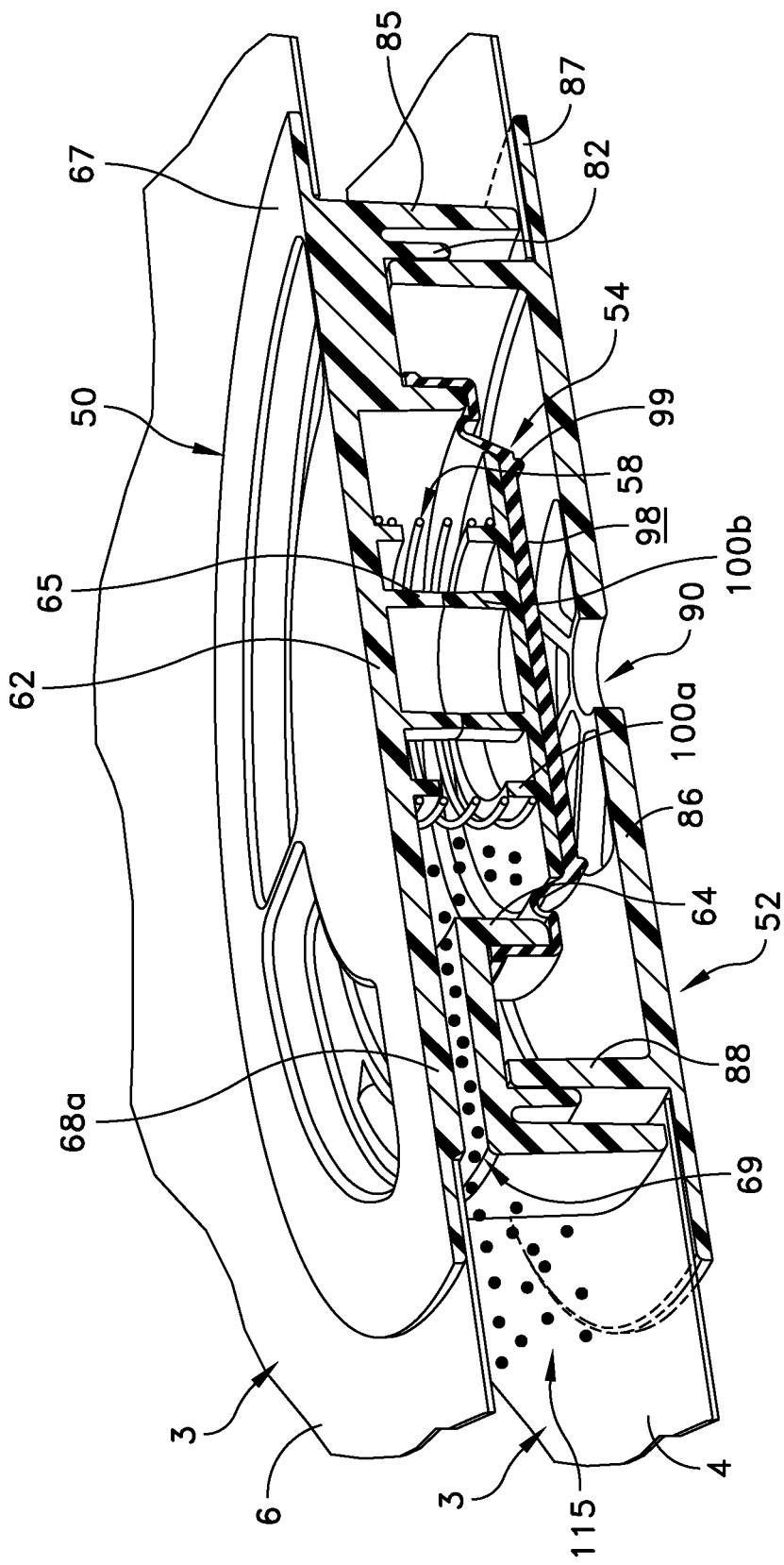
FIG. 24 is a cross-sectional perspective view similar to FIGS. 20-23 showing air transit between the interior of the unidirectional valve and the space between the top and bottom mattresses.
Figure 25:
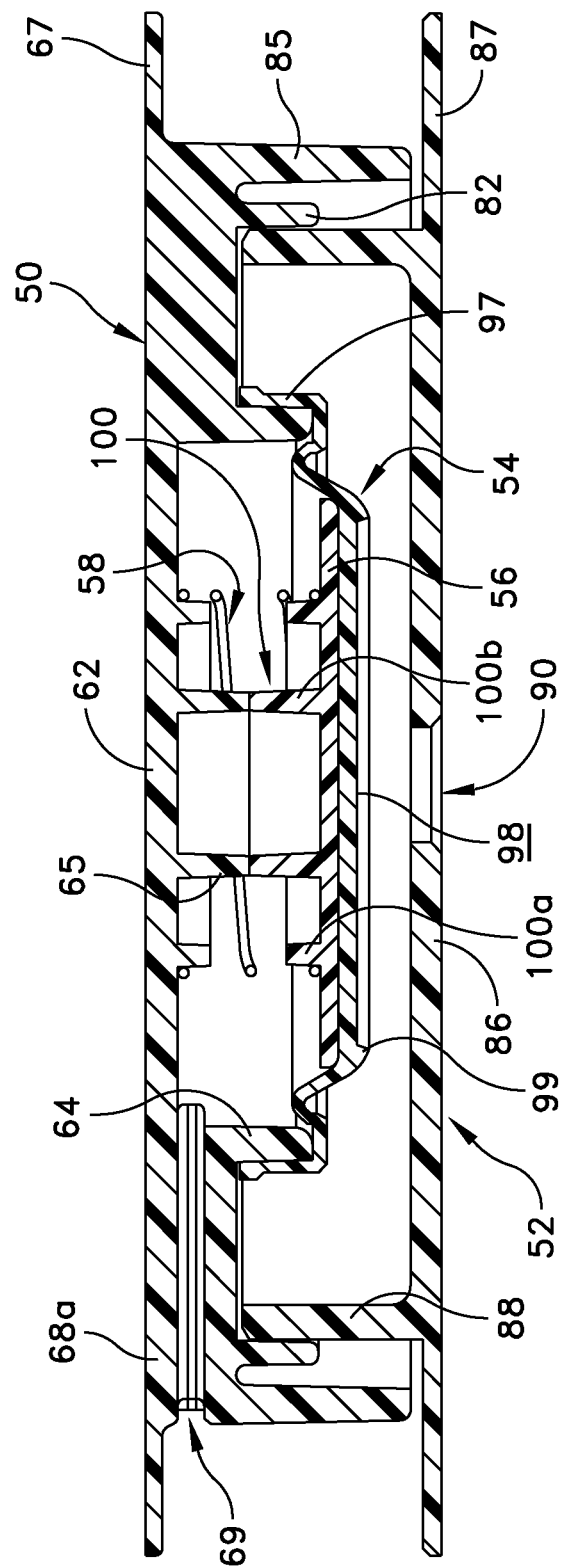
FIG. 25 is a cross-sectional view of a fully assembled unidirectional valve in accordance with the present invention.

This air filling process of bottom mattress 3 continues until the pressure within central chamber 27 reaches a pressure a which is sufficient to overcome the bias imparted to baffle 54 by spring 58, i.e., reaches or exceeds the cracking pressure required to further compress preloaded spring 58. As this bias is overcome, central planar portion 95 flexes inwardly against the biasing force of spring 58 and about flexible annular protrusion 96. This in turn lifts lip 99 away from the inner surface of plate 86 on bottom housing 52 thereby placing through-holes 78, through-openings 75, and openings 90 in free air flow communication with one another (FIGS. 22-24). Advantageously, annular ring 100b of spring plate 56 will, upon sufficient compression of spring 58, engage a corresponding, coaxially arranged annular ring 65 that projects downwardly from the under surface of central pier 62 of top housing 50. Air flows through unidirectional valve 10 from the bottom mattress into the top mattress until the top mattress is also inflated, and until the relative air pressure within the top mattress and the bottom mattress are substantially the same. As the pressures in the two mattresses equalize, spring 58 which is located within internal chamber 110 and held at the same pressure as region 115 between the top and bottom mattresses, e.g., ambient atmospheric pressure, is once again able to bias outwardly baffle 54. Advantageously, air flow communication between internal chamber 110, where spring 58 is housed, and region 115 via conduit 69 allows the differences in pressure between the top and bottom mattresses to act upon resilient baffle 54 to open and close valve 10. As a result, lip 99 of baffle 54 moves back into substantially sealing engagement with the inner surface of plate 86 and in surrounding relation to openings 90. This causes airflow communication between through-holes 78 and through-openings 75 defined in top housing 50 and openings 90 in bottom housing 52 to cease. If the pressure within either the top or bottom mattress is released so as to deflate that particular mattress, unidirectional valve will remain in a closed position, i.e., lip 99 in substantially sealing engagement with the inner surface of plate 86 and in surrounding and sealing relation to openings 90. This arrangement prevents airflow communication between through-holes 78, through-openings 75, and openings 90.

It will be understood that a maximum achievable height of the fully inflated pneumatic lift 1 will be determined by the number of inflatable mattresses 3 that have been stacked one atop the other in accordance with the assembly procedures herein described. In order to lower an object, it is simply necessary to open one or more inlet/outlets 32 so as to allow the pressurized air to flow outwardly thereby deflating pneumatic lift 1.

It is to be understood that the present invention is by no means limited only to the particular constructions herein disclosed and shown in the drawings, but also comprises any modifications or equivalents within the scope of the claims.

What is claimed is:

1. A system of inflating or deflating stacked mattresses comprising, in combination:
a unidirectional valve arranged in air flow communication between each of a first inflatable mattress and a second inflatable, said unidirectional valve including a first housing configured to sealingly penetrate a portion of said first inflatable mattress with at least one opening in said first housing communicating with an interior of said first inflatable mattress and a conduit communicating between an interior portion of said first housing and an ambient external environment wherein said first housing includes a central pier having an intermittent free edge, a downwardly projecting annular wall, and two spaced apart, coaxially arranged annular rings that project downwardly from an under surface of said central pier, such that said two spaced apart annular rings are arranged in coaxial relation to said downwardly projecting annular wall and said central pier structurally supports an annular flange with a plurality of struts that extend radially outwardly in circumferentially spaced relation to one another from said free edges and further wherein one of said struts is wider and thicker than other of said struts so as to provide sufficient structural support for said conduit communicating between said interior portion of said first housing and said external ambient environment;
a second housing configured to sealingly penetrate a portion of said second inflatable mattress so as to be in mating relationship with said first housing, said second housing having at least one opening communicating with an interior of said second mattress wherein said second housing includes a plate and an upwardly projecting annular wall arranged on said plate so as to be complementarily positioned with respect to said first housing; and
a resilient diaphragm captured by said first housing so as to isolate said conduit from said interiors of said inflatable mattresses thereby maintaining said interior portion of said first housing at an ambient external pressure during inflation or deflation of said first and second inflatable mattresses.

2. A pneumatic lift comprising:
a first inflatable mattress that defines a first internal chamber;
a second inflatable mattress that defines a second internal chamber, wherein said first inflatable mattress is positioned in overlying relation to said second inflatable mattress so as to define a common region between them; and
a unidirectional valve arranged in air flow communication with each of said first internal chamber and said second internal chamber, said unidirectional valve comprising a first housing sealingly penetrating a portion of said first inflatable mattress with at least one opening in said first housing communicating with said first internal chamber and a pressure-equalization conduit communicating between an interior portion of said first housing and said common region wherein said first housing includes a central pier having an intermittent free edge, a downwardly projecting annular wall, and two spaced apart, coaxially arranged annular rings that project downwardly from an under surface of said central pier, such that said two spaced apart annular rings are arranged in coaxial relation to said downwardly projecting annular wall and said central pier structurally supports an annular flange with a plurality of struts that extend radially outwardly in circumferentially spaced relation to one another from said free edges and further wherein one of said struts is wider and thicker than other of said struts so as to provide sufficient structural support for said conduit communicating between said interior portion of said first housing and said external ambient environment;

a second housing sealingly penetrating a portion of said second inflatable mattress in aligned, mating relationship with said first housing, said second housing having at least one opening communicating with said second internal chamber wherein said second housing includes a plate and an upwardly projecting annular wall arranged on said plate so as to be complementarily positioned with respect to said first housing; and a diaphragm captured by said first housing so as to isolate said pressure- equalization conduit from said at least one openings in said first and said second housings thereby maintaining said interior portion of said first housing at an ambient pressure defined by said common region during inflation and deflation of said first and second inflatable mattresses.

3. A pneumatic lift comprising:

a first inflatable mattress having a top panel, a bottom panel, and a perimeter band that joins said top panel to said bottom panel so as to define a first chamber;

a second inflatable mattress having a top panel, a bottom panel, and a perimeter band that joins said top panel to said bottom panel so as to define a second chamber, wherein said first inflatable mattress is positioned in overlying relation to said second inflatable mattress such that said bottom panel of said first inflatable mattress confronts said top panel of said second inflatable mattress thereby defining a region between said confronting top panel and bottom panels;

wherein said inflatable mattresses are arranged in internal air flow communication with one another through a unidirectional valve comprising:

a first housing sealingly penetrating said bottom panel of said first inflatable mattress with at least one opening communicating with said first chamber and a pressure-equalization conduit communicating between an interior portion of said first housing and said region between said confronting top panel and bottom panels wherein said first housing includes a central pier having an intermittent free edge, a downwardly projecting annular wall, and two spaced apart, coaxially arranged annular rings that project downwardly from an under surface of said central pier, such that said two spaced apart annular rings are arranged in coaxial relation to said downwardly projecting annular wall and said central pier structurally supports an annular flange with a plurality of struts that extend radially outwardly in circumferentially spaced relation to one another from said free edges and further wherein one of said struts is wider and thicker than other of said struts so as to provide sufficient structural support for said conduit communicating between said interior portion of said first housing and said external ambient environment;

a second housing sealingly penetrating said top panel of said second inflatable mattress in aligned, mating relationship with said first housing, said second housing having at least one opening communicating with said second chamber wherein said second housing includes a plate and an upwardly projecting annular wall arranged on said plate so as to be complementarily positioned with respect to said first housing; and a biased diaphragm captured by a portion of said first housing so as to isolate said pressure-equalization conduit and said an interior portion of said first housing from said at least one openings in said first and said second housings thereby maintaining said pressure-equalization conduit of said first housing at a common pressure defined by said region during inflation and deflation of said first and second inflatable mattresses.

4. A pneumatic lift according to claim 3 wherein each of said inflatable mattresses comprise a top panel having a peripheral edge and a bottom panel having a peripheral edge with a perimeter band sealed to and extending between said peripheral edges so as to define an internal chamber.

5. A pneumatic lift according to claim 4 wherein said internal chamber houses a plurality of spaced apart transverse baffle-panels that extend between said top panel and said bottom panel.

6. A pneumatic lift according to claim 4 wherein each of said inflatable mattresses is fixedly fastened to an adjacent inflatable mattress.

\* \* \* \* \*